UNITED STATES PATENT OFFICE 2,603,606

STABILIZED AQUEOUS SOLUTIONS OF SURFACE-ACTIVE SODIUM SECONDARY ALKYL SULFATES

Siegfried Leonard Langedijk and Pieter Nicolaas Degens, Amsterdam, Netherlands, assignors to Shell Development Company, San Francisco, Calif., a corporation of Delaware No Drawing. Application January 29, 1948, Serial No. 5,186. In the Netherlands February 3, 1947

4 Claims. (Cl. 252—161)

This invention relates to a process for stabilizing solutions of higher, surface-active secondary sodium alkylsulfates in such a manner that they lose to a substantial extent their tendency to crystallize and gel, particularly at low temperatures, and to solutions of the aforesaid sodium alkylsulfates thus stabilized.

It is known that by sulfation of higher olefines, i. e. olefines having at least 6 carbon atoms, e. g. from 8 to 20 carbon atoms, in the molecule or of the corresponding secondary alcohols, and neutralization of the resulting sulfation product secondary sodium alkylsulfates can be prepared, which possess very valuable surface-active properties.

In the preparation of these sodium alkylsulfates the latter are obtained in the form of aqueous solutions which generally contain, besides for example 20 to 25% of estersalt, a certain proportion of inorganic salt, chiefly sodium sulfate, which may be relatively high, e. g. 6 to 7% or higher. These solutions show a tendency to gel and/or crystallize after a short time, when stored, especially at low temperatures. As a result considerable difficulties are encountered in storing and transporting the respective solutions, particularly during the winter season.

It is an object of the present invention to provide a method whereby this highly undesirable property of the said estersalt solutions is improved and an effective stabilization of the solutions at low temperature can be attained.

The invention is based on the discovery that through the presence of potassium ions, introduced as inorganic salt, in the sodium alkyl sulphate solutions the stability of these solutions can be increased to such an extent that their tendency to crystallize and/or gel at low temperatures is checked considerably, as a result of which the said phenomena take a much longer time in appearing. This effect is all the more surprising because the corresponding potassium alkyl sulphate solutions show a greater tendency to crystallize and/or gel than the sodium alkyl sulphate solutions.

Consequently, the process according to the invention is characterized by the addition of an inorganic potassium salt to the solution to be stabilized so as to cause the presence therein of a sufficient quantity of potassium ions for the tendency of the solution to crystallize and/or gel to be considerably checked even at low temperatures, e. g. between 0° and 10° C.

The quantity of potassium ions required to attain the stabilization aimed at is preferably introduced by adding potassium sulphate to the sodium alkyl sulphate solution to be stabilized, it having been found that with this salt a particularly effective stabilization is attained. However, also the addition of other soluble, inorganic potassium salts, such as the chloride and the nitrate, results in a considerable improvement of the stability. Ester salt solutions containing only a moderate proportion e. g. 2–5% of sodium sulfate, as well as those containing a higher content, e. g. 6–7% or more, can be effectively stabilized according to the invention.

The quantity of the potassium ions required for attaining a sufficient degree of stabilization depends on the concentration and nature of the secondary sodium alkyl sulphate solutions, on the content of inorganic salt of said solutions, and further on the form in which the potassium ions are introduced. It is in general larger accordingly as the concentration of sodium alkyl sulphates and inorganic salt is higher. The proper quantity to be employed may be determined experimentally for each individual case. In general a sufficient quantity of potassium ions should be present for the atomic ratio between potassium and sodium to be about 1:3. As a rule, ratios substantially exceeding 1:1 should be avoided, since in that case, especially if the solutions have a comparatively high content of ester salt and inorganic salt, it is not possible to obtain sufficiently stable products.

The presence of the potassium ions is found to check not only the crystallization of the sodium sulphate usually present in the ester salt solution, but also the troublesome gelling tendency of the ester salt.

The effect attained by the process according to the invention is further illustrated by the following examples.

Example I

An ester salt solution was prepared by reaction of a mixture of olefines containing from 10 to 18 carbon atoms in the molecule with sulfuric acid and neutralization of the resulting sulfation product with sodium hydroxide.

To the solution which contained 30% sodium alkyl sulphates and 0.5% sodium sulphate increasing amounts of potassium sulphate were added. The resulting solutions were kept at a temperature of 5° C. in a cooling-thermostat and the period of time till crystallization set in was determined.

The result of these tests is given in the following table, as also that of a similar test with an ester salt solution containing 3% sodium sulphate.

| Ester salt content | Na$_2$SO$_4$ content | K$_2$SO$_4$ added | Na:K ratio | Time till crystallization sets in |
|---|---|---|---|---|
| Percent | Percent | Percent | | hrs |
| 30 | 3 | ------ | ------ | 15 |
| 30 | 0.5 | ------ | ------ | 75 |
| 30 | 0.5 | 3.2 | 1:0.3 | 105 |
| 30 | 0.5 | 4.4 | 1:0.5 | 230 |
| 30 | 0.5 | 5.6 | 1:0.6 | >300 |
| 30 | 0.5 | 6.9 | 1:0.8 | >300 |

In a comparative stability test at 5° C. with a corresponding potassium alkyl sulphate solution of 30%, containing about 1.5% potassium sulphate the solution crystallized completely within 3 hours.

Example II

Starting from a C$_{10}$–C$_{18}$ olefine mixture, sodium alkyl sulphate solutions of the following composition were made:

I. 20% Na alkyl sulphate and 6.7% Na$_2$SO$_4$
II. 20% Na alkyl sulphate and 3.9% Na$_2$SO$_4$
III. 20% Na alkyl sulphate, 3.9% Na$_2$SO$_4$ and 3.4% K$_2$SO$_4$
IV. 20% Na alkyl sulphate, 3.9% Na$_2$SO$_4$ and 2.9% KCl
V. 20% Na alkyl sulphate, 3.9% Na$_2$SO$_4$ and 3.9% KNO$_3$ The quantities of K$_2$SO$_4$, KCl, and KNO$_3$ added to the solutions III, IV, and V have been so chosen that the total molar concentration of inorganic salt is equal to that in solution I, the molecular ratio between sodium and potassium in the solutions III, IV and V was 3:1.

These solutions were then cooled down to 0° C. by introducing them into a test-tube in melting ice. When stored at this temperature, the solutions I and II were found to show a crystallizing tendency already after 2 hours. In the solutions IV and V the crystallization phenomena did not begin to appear until after about 30 hours, while with solution III this was not the case until after about 35 hours.

From these experiments it is clear that the effect of the potassium ions is greater if potassium sulphate is added than in the case of admixture of other potassium salts.

We claim:

1. A surface-active composition consisting essentially of an aqueous solution of sodium secondary alkyl sulphate having from 8 to 20 carbon atoms in the molecule containing 20% to 30% by weight of sodium alkyl sulphate, from 2% to at least 7% of sodium sulphate and such a proportion of an inorganic potassium salt selected from the group consisting of potassium sulfate, potassium chloride, and potassium nitrate that the atomic ratio between potassium and total sodium in the solution ranges between about 0.3:1 and 1:1.

2. A liquid detergent composition stable to crystallization and gelling at low temperatures consisting essentially of an aqueous solution of 20% to 30% by weight of sodium secondary alkyl sulphate of 8 to 20 carbon atoms per molecule, 2% to 7% of sodium sulphate and an amount of inorganic potassium salt selected from the group consisting of potassium chloride, potassium nitrate and potassium sulphate such that the atomic ratio of potassium to total sodium in the solution is between 0.3:1 and about 0.8:1.

3. A surface-active composition consisting essentially of an aqueous solution of sodium secondary alkyl sulfate having 8 to 20 carbon atoms in the molecule and sodium sulfate in a weight ratio of about 2:30 to about 7:20 expressed as parts of sodium sulfate per parts of sodium alkyl sulfate, together with an amount of an inorganic potassium salt selected from the group consisting of potassium sulfate, potassium chloride, and potassium nitrate such that the atomic ratio of potassium to total sodium in the solution is in the range of about 0.6:1 to about 0.8:1.

4. A surface-active composition consisting essentially of an aqueous solution of sodium secondary alkyl sulfate having 8 to 20 carbon atoms in the molecule and sodium sulfate in a weight ratio of about 2:30 to about 7:20 expressed as parts of sodium sulfate per parts of sodium alkyl sulfate, together with an amount of potassium sulfate such that the atomic ratio of potassium to total sodium in the solution is between 0.3:1 and 0.8:1.

SIEGFRIED LEONARD LANGEDIJK.
PIETER NICOLAAS DEGENS.

REFERENCES CITED

The following references are of record in the file of this patent:

UNITED STATES PATENTS

| Number | Name | Date |
|---|---|---|
| 1,906,484 | Nuesslein | May 2, 1933 |
| 1,968,797 | Bertsch | July 31, 1934 |
| 1,999,629 | Friesenhahn | Apr. 30, 1935 |
| 2,082,576 | Henke | June 1, 1937 |
| 2,235,098 | Brandt et al. | Mar. 18, 1941 |
| 2,264,737 | Bertsch | Dec. 2, 1941 |
| 2,434,683 | Buis | Jan. 20, 1948 |

OTHER REFERENCES

Smith's College Chemistry, 6th Ed., 1946, page 501.